(12) United States Patent
Silverman et al.

(10) Patent No.: US 12,013,819 B2
(45) Date of Patent: *Jun. 18, 2024

(54) ASYNCHRONOUS METHOD FOR PROVISIONING A SERVICE USING FILE DISTRIBUTION TECHNOLOGY

(71) Applicant: ZixCorp Systems, Inc., Dallas, TX (US)

(72) Inventors: Dustin Stewart Silverman, Richardson, TX (US); Patrick Stephen Trantham, Sunnyvale, CA (US); Robert Jamison White, Pensacola, FL (US); Philippe-Jacques Thomas Green, Ann Arbor, MI (US); Bryan Adam Joyner, Sachse, TX (US); Cara Joy Drye, Pensacola, FL (US); Michael Patrick Bower, Milton, FL (US)

(73) Assignee: ZixCorp Systems, Inc., Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/874,049

(22) Filed: Jul. 26, 2022

(65) Prior Publication Data
US 2022/0358092 A1 Nov. 10, 2022

Related U.S. Application Data

(63) Continuation of application No. 17/080,163, filed on Oct. 26, 2020, now Pat. No. 11,436,197, which is a
(Continued)

(51) Int. Cl.
*G06F 16/178* (2019.01)
*G06F 9/54* (2006.01)
*G06F 16/23* (2019.01)

(52) U.S. Cl.
CPC ........... *G06F 16/178* (2019.01); *G06F 9/542* (2013.01); *G06F 16/2379* (2019.01)

(58) Field of Classification Search
None
See application file for complete search history.

(56) References Cited

U.S. PATENT DOCUMENTS 10,567,388 B1 * 2/2020 Kruse .................... H04L 63/10
10,587,653 B2 * 3/2020 Kruse .................... H04L 63/20
(Continued)

FOREIGN PATENT DOCUMENTS

CA          2801659        7/2013

OTHER PUBLICATIONS

Office Action for U.S. Appl. No. 16/942,202, dated Aug. 8, 2022, 36 pgs.
(Continued)

*Primary Examiner* — Phyllis A Book
(74) *Attorney, Agent, or Firm* — Sprinkle IP Law Group

(57) ABSTRACT

According to certain embodiments, a provisioning manager comprises an interface and processing circuitry. The interface is configured to obtain provisioning data from a provisioning database. The processing circuitry is configured to prepare one or more configuration files based on the provisioning data. The configuration file(s) indicate how to provision one or more service instances. The processing circuitry is further configured to commit the configuration file(s) to one or more repositories in order to make the configuration file(s) available to at least one of the service instances. The processing circuitry is further configured to send one or more notifications indicating to one or more of the service instances that the configuration file(s) have been committed to the one or more repositories.

18 Claims, 6 Drawing Sheets

Related U.S. Application Data continuation-in-part of application No. 16/942,202, filed on Jul. 29, 2020, now Pat. No. 11,611,473, which is a continuation-in-part of application No. 15/896,569, filed on Feb. 14, 2018, now Pat. No. 11,102,192, and a continuation-in-part of application No. 14/154,755, filed on Jan. 14, 2014, now Pat. No. 10,742,717.

(56) References Cited

U.S. PATENT DOCUMENTS

| | | | |
|---|---|---|---|
| 11,023,218 B1* | 6/2021 | Lu | G06F 21/577 |
| 11,611,473 B2 | 3/2023 | Joyner | |
| 2002/0165962 A1 | 11/2002 | Alvarez | |
| 2006/0036463 A1* | 2/2006 | Patrick | G06Q 10/10 705/1.1 |
| 2011/0209193 A1 | 8/2011 | Kennedy | |
| 2013/0339297 A1* | 12/2013 | Chen | G06F 16/273 707/624 |
| 2014/0026181 A1* | 1/2014 | Kiang | G06Q 10/103 726/1 |
| 2014/0032733 A1 | 1/2014 | Barton | |
| 2016/0182314 A1 | 6/2016 | Will | |
| 2016/0277368 A1 | 9/2016 | Narayanaswamy | |
| 2016/0294563 A1 | 10/2016 | Qian | |
| 2017/0046235 A1* | 2/2017 | Straub | G06F 8/35 |
| 2017/0048339 A1* | 2/2017 | Straub | G06F 16/2379 |
| 2017/0060918 A1 | 3/2017 | Iyer | |
| 2017/0085650 A1* | 3/2017 | Mungo | H04L 67/53 |
| 2017/0118249 A1 | 4/2017 | Motukuru | |
| 2017/0118268 A1 | 4/2017 | Wu | |
| 2017/0272316 A1* | 9/2017 | Johnson | H04L 61/301 |
| 2018/0006881 A1 | 1/2018 | Anandam | |
| 2018/0007061 A1* | 1/2018 | Liebmann | H04L 63/0227 |
| 2018/0115587 A1 | 4/2018 | Roth | |
| 2018/0270290 A1* | 9/2018 | Sinha | H04L 67/2871 |
| 2018/0367575 A1 | 12/2018 | Narayanaswamy | |
| 2019/0098071 A1* | 3/2019 | Bitincka | H04L 41/0856 |
| 2019/0104116 A1* | 4/2019 | Nayshtut | G06F 21/6245 |
| 2019/0349426 A1* | 11/2019 | Smith | H04W 12/69 |
| 2019/0354695 A1 | 11/2019 | Agarwal | |
| 2020/0034458 A1 | 1/2020 | Mehta | |
| 2020/0304503 A1 | 9/2020 | Zerrad | |
| 2023/0198836 A1 | 6/2023 | Joyner et al. | |

OTHER PUBLICATIONS

Office Action issued for U.S. Appl. No. 18/170,410, mailed Dec. 12, 2023, 11 pages.

Notice of Allowance issued for U.S. Appl. No. 18/170,410, mailed Apr. 29, 2024, 10 pages.

* cited by examiner

ASYNCHRONOUS METHOD FOR PROVISIONING A SERVICE USING FILE DISTRIBUTION TECHNOLOGY

RELATED APPLICATIONS

This application is a continuation of, and claims a benefit of priority under 35 U.S.C. 120 from, U.S. patent application Ser. No. 17/080,163, filed Oct. 26, 2020, entitled "ASYNCHRONOUS METHOD FOR PROVISIONING A SERVICE USING FILE DISTRIBUTION," issued as U.S. Pat. No. 11,436,197, which is a continuation-in-part of U.S. patent application Ser. No. 16/942,202, filed Jul. 29, 2020, entitled "PROVISIONING A SERVICE USING FILE DISTRIBUTION TECHNOLOGY," issued as U.S. Pat. No. 11,611,473, which is a continuation-in-part of U.S. patent application Ser. No. 14/154,755, filed Jan. 14, 2014, entitled "ELECTRONIC CONTENT DELIVERY WITH DISTRIBUTED RECIPIENT DELIVERY PREFERENCE," issued as U.S. Pat. No. 10,742,717, and U.S. patent application Ser. No. 15/896,569, filed Feb. 14, 2018, entitled "HARVESTING AND DISTRIBUTING A CERTIFICATE BASED ON A DNS NAME," issued as U.S. Pat. No. 11,102,192. All applications listed in this paragraph are fully incorporated by reference herein in their entirety for all purposes.

FIELD OF THE INVENTION

Certain embodiments of the present disclosure relate, in general, to provisioning a service and, more specifically, to an asynchronous method for provisioning a service using file distribution technology.

BACKGROUND

A service may be provisioned in a computer network to configure the service for use by a user. Existing methods for provisioning a service may have some drawbacks. For example, existing methods for provisioning a service may require a service provider to manually configure certain settings. Manually configuring these settings may be inefficient and error-prone, particularly when provisioning services for many users.

SUMMARY

According to certain embodiments, a provisioning manager comprises an interface and processing circuitry. The interface is configured to obtain provisioning data from a provisioning database. The processing circuitry is configured to prepare one or more configuration files based on the provisioning data. The one or more configuration files indicate how to provision one or more service instances. The processing circuitry is further operable to commit the one or more configuration files to one or more repositories. Each of the one or more repositories is configured to make at least one of the one or more configuration files available to at least one of the one or more service instances. The processing circuitry is further operable to send one or more notifications. The one or more notifications indicate to one or more of the service instances that the one or more configuration files have been committed to the one or more repositories.

According to certain embodiments, one or more non-transitory computer readable media store logic that, when executed by processing circuitry of a provisioning manager, is operable to cause the provisioning manager to perform actions. The actions comprise obtaining provisioning data from a provisioning database and preparing one or more configuration files based on the provisioning data. The one or more configuration files indicate how to provision one or more service instances. The actions further comprise committing the one or more configuration files to one or more repositories. Each of the one or more repositories is configured to make at least one of the one or more configuration files available to at least one of the one or more service instances. The actions further comprise sending one or more notifications. The one or more notifications indicate to one or more of the service instances that the one or more configuration files have been committed to the one or more repositories.

According to certain embodiments, a method comprises obtaining provisioning data from a provisioning database and preparing one or more configuration files based on the provisioning data. The one or more configuration files indicate how to provision one or more service instances. The method further comprises committing the one or more configuration files to one or more repositories. Each of the one or more repositories is configured to make at least one of the one or more configuration files available to at least one of the one or more service instances. The method further comprises sending one or more notifications. The one or more notifications indicate to one or more of the service instances that the one or more configuration files have been committed to the one or more repositories.

Certain embodiments of the above-described provisioning manager, logic, and/or method may include one or more additional features, such as any one or more of the following:

In some embodiments, the one or more notifications are sent according to a publisher/subscriber model. As an example, a first notification of the one or more notifications may be sent according to the publisher/subscriber model. Certain embodiments indicate one or more topics associated with the first notification. The one or more topics indicate that each of the one or more service instances that subscribes to one or more of the topic(s) associated with the first notification is to receive and process the first notification. In some embodiments, the one or more topics associated with the first notification relate to at least one policy for handling electronic messages, such as at least one of: encryption policy, quarantine policy, antivirus filter policy, anti-spam filter policy, archiving policy, and branding policy.

In some embodiments, the one or more notifications are sent according to a message queue model wherein each of the one or more service instances is associated with a corresponding message queue. As an example, a first notification of the one or more notifications may be sent according to the message queue model. The first notification indicates that a first configuration file of the one or more configuration files has been committed to the one or more repositories. Prior to sending the first notification, the processing circuitry, logic, or method determines a subset of the one or more service instances to which the first configuration file applies such that the first notification is sent to the message queue(s) corresponding to the subset of the one or more service instances to which the first configuration file applies without sending the first notification to the message queue(s) corresponding to the other service instance(s) to which the first configuration file does not apply.

Some embodiments initiate obtaining the provisioning data in response to receiving a notification indicating that the provisioning data has been added, modified, or removed in the provisioning database.

Some embodiments prepare a first configuration file of the one or more configuration files. Preparing the first configuration file includes determining the provisioning data to include in the first configuration file, determining whether to include any additional data in the first configuration file to assist the one or more service instances in applying the provisioning data, and formatting the first configuration file according to a format that the one or more service instances are able to use for provisioning.

In some embodiments, at least one of the one or more configuration files indicates at least one of the following types of data used in sending or receiving electronic messages: an identification of one or more domains; domain mapping information; an identification of one or more clients; mail relay configuration data; and mail transport configuration data.

In some embodiments, a first of the one or more repositories comprises a source code control repository, a version control repository, or an object store, and the processing circuitry is further configured to use a file distribution technology to commit the one or more configuration files to the first repository. For example, in some embodiments, the file distribution technology comprises at least one of Git, J/Git, Concurrent Version System (CVS), Subversion (SVN), Mercurial, Team Foundation Server (TFS), Clearcase, SourceSafe, Ceph, or Simple Storage Service (S3) technology.

According to some embodiments, a service instance comprises an interface configured to receive a notification. The notification indicates that a configuration file has been committed to a repository. The service instance further comprises processing circuitry configured to retrieve the configuration file from the repository based at least in part on receiving the notification and to apply the configuration of the configuration file. As an example, in the publisher/subscriber model, the service instance may retrieve the configuration file from the repository based on receiving the notification and determining that the service instance is subscribed to a channel or topic associated with the notification. As another example, in the message queue model, the notification may be received at a message queue associated with the service instance, and the service instance may retrieve the configuration file based on receiving the notification via the message queue.

According to certain embodiments, one or more non-transitory computer readable media store logic that, when executed by processing circuitry of a service instance, is operable to cause the service instance to perform actions. The actions comprise receiving a notification indicating that a configuration file has been committed to a repository, retrieving the configuration file from the repository based at least in part on receiving the notification, and applying the configuration of the configuration file.

According to certain embodiments, a method performed by a service instance comprises receiving a notification indicating that a configuration file has been committed to a repository, retrieving the configuration file from the repository based at least in part on receiving the notification, and applying the configuration of the configuration file.

Certain embodiments may be directed to a system that includes both the provisioning manager and at least one of the service instances (e.g., the first service instance). Similarly, a method performed by such a system may include certain actions performed by the provisioning manager and certain actions performed by the service instance. Similarly, computer readable media used by such a system may store logic for the provisioning manager on a first computer readable medium and logic for the service manager on a second computer readable medium.

Some embodiments of the disclosure may provide one or more technical advantages. As an example of a technical advantage, certain embodiments may allow for efficient and accurate provisioning of a service in a computer network. For example, a provisioning manager may obtain provisioning data from a database. The provisioning manager may obtain the provisioning data in response to receiving a notification indicating that provisioning data was added, modified, or deleted in the provisioning database, or the provisioning manager may obtain the provisioning data by periodically polling the database to check for provisioning data that was added, modified, or deleted. The provisioning manager may use the provisioning data to prepare a configuration file. The configuration file arranges the provisioning data in a format that can be applied by a service instance. The provisioning manager may then store the configuration file in a repository from which one or more service instances obtain the configuration file. The provisioning manager sends the one or more service instances a notification indicating that the repository contains a new or updated configuration file for that service instance. In response to the notification, the service instance obtains the configuration file from the repository and applies the configuration indicated in the configuration file.

As another example of a technical advantage, certain embodiments enable the provisioning manager to perform an asynchronous method for provisioning a service instance using file distribution technology. In general, an asynchronous method may refer to a method of controlling timing in a computer system in which a specific operation begins in response to a notification indicating that the preceding operation has been completed. As an example, in certain embodiments, a service instance may begin the operation of retrieving a configuration file from a repository in response to receiving a notification indicating that a provisioning manager has completed the operation of committing the configuration file to the repository. The asynchronous method may allow for certain advantages compared to alternative methods that require each service instance to perform periodic polling to check whether the repository contains any new or updated configuration file associated with the respective service instance. For example, overhead messaging may be reduced because each service instance need not check the repository until a new or updated configuration file becomes available for that service instance. Reducing the amount of messaging frees up network bandwidth and improves processing efficiency because the service instances do not need to process or send unnecessary calls to the repository.

Certain embodiments of the asynchronous method may allow for faster provisioning of a service instance. For example, instead of relying on the service instance to periodically check the repository for configuration files, which can delay when the service instance becomes aware of new or updated configuration files, the asynchronous method can notify the service instance as soon as the configuration file becomes available. Thus, the service instance can retrieve the configuration file as soon as it becomes available for faster provisioning. Certain embodiments of the asynchronous method provide the further advantage that the notification to the service instances may indicate a topic that relates to the new and/or updated configuration file(s). If the topic is relevant to the service instance, the service instance may retrieve the configuration file. If the topic is not relevant to the service instance, the service instance need not retrieve the configuration file. For example, if the notification indicates that the configuration file relates to an encryption policy, a service instance responsible for encryption may retrieve the configuration file, while a service instance that is not responsible for encryption need not retrieve the configuration file. In this manner, unnecessary calls to the repository may be further reduced. Certain embodiments may be well-suited to multi-tenant environments, for example, by tailoring the notifications to notify the service instance(s) associated with one or more tenants to which the new or updated configuration file applies.

As another example of a technical advantage, certain embodiments may allow for faster and/or simpler provisioning of a new service instance, such as when a new customer is added or a new computing system comes online. The new service instance may be configured to retrieve an initial configuration file from the repository associated with the provisioning manager. Once the initial provisioning is complete, the new service may retrieve a new or updated configuration file from the repository, which may allow for further customizing the service instance for use by the user.

As another example of a technical advantage, certain embodiments may allow for a simplified architecture for provisioning a service instance. For example, certain embodiments may implement provisioning functionality without requiring application changes other than the addition of a simple software utility to receive notifications and retrieve configuration files in response to the notifications. The simplified architecture can be applied to legacy systems that have life cycles that are rigid or difficult to change.

As another example of a technical advantage, certain embodiments may allow for a distributed and flexible solution. For example, a provisioning manager can run anywhere. Similarly, service instances can run anywhere. The relationship between a provisioning manager and tenants (or service instances) can be one-to-one, one-to-many, or many-to-many.

As another example of a technical advantage, certain embodiments may allow for implementing a provisioning solution using resilient, proven technologies, such as file distribution technologies.

Some embodiments may benefit from some, none, or all of these advantages. Other technical advantages may be readily ascertained by one of ordinary skill in the art.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

Embodiments of the present invention are described in FIGS. 1-6 of the drawings, like numerals being used for like and corresponding parts of the various drawings.

Figure 1:
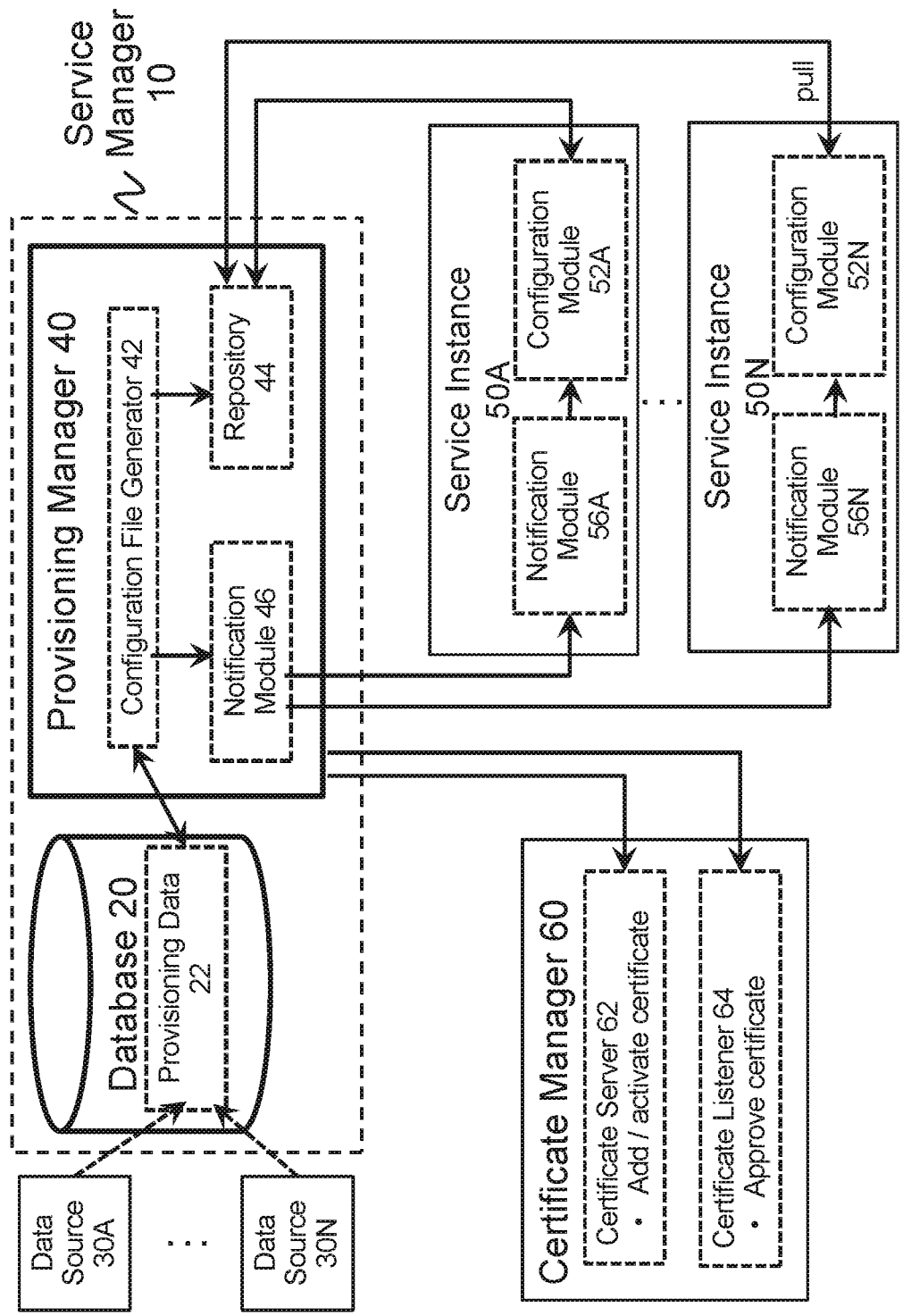
FIG. 1 illustrates an example of a system for provisioning a service instance, according to certain embodiments.

FIG. 1 illustrates an example of a system for provisioning a service instance, according to certain embodiments. The system illustrated in FIG. 1 includes a service manager 10, a database 20, data sources 30A-30N, a provisioning manager 40, a plurality of service instances 50A-50N, and a certificate manager 60. In certain embodiments, components of the system communicate via one or more networks. Examples of networks may comprise all or a portion of one or more of the following: a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, other suitable communication link, or any combination of any of the preceding.

In general, service manager 10 manages services provided to users. In certain embodiments, service manager 10 may comprise database 20 and provisioning manager 40 to facilitate provisioning the services. Optionally, service manager 10 may include other components to facilitate managing other aspects of the services, such as components for handling user traffic, monitoring and managing system performance, determining whether maintenance is required, determining service utilization (e.g., for network planning or billing purposes), and/or providing other suitable functionality. Each component of service manager 10 may be communicatively coupled to one or more other components of service manager 10 in any suitable manner. As an example, database 20 and provisioning manager 40 may run on the same device, may be directly connected (e.g., via a cable), or may be connected through one or more networks.

Database 20 comprises provisioning data 22. Provisioning data 22 may be used to provision one or more service instances 50. Thus, provisioning data 22 may comprise any suitable identifiers to facilitate identifying which provisioning data 22 corresponds to a particular service instance 50. In some embodiments, database 20 may be a relational database that organizes items of provisioning data 22 based on relationships to other items of provisioning data 22. As an example, a relational database may indicate a relationship between items of provisioning data 22 that are associated with the same enterprise. An enterprise may generally refer to a group of users configured to have at least some provisioning data 22 in common. As an example, an enterprise may be a company and the users may be employees of the company. Service instances 50 configured for these employees may have at least company-specific provisioning data 22 in common. In certain embodiments, the enterprise may be a customer of a service being offered by a service provider. As an example, an email service provider may host email services for a number of enterprise customers and/or a number of customers that are individual users.

In certain embodiments, database 20 receives provisioning data 22 from one or more data sources 30A, 30B, . . . 30N. In certain embodiments, a data source 30 may comprise a provisioning management application. The provisioning management application may collect information from one or more users and/or from one or more other systems, generate provisioning data 22 based on the information collected, and input the provisioning data 22 to database 20. Different data sources 30 may run different provisioning management applications, for example, to collect information from different types of users or different types of systems. To collect the information from a user, each provisioning management application may provide a user interface. Depending on the implementation and the type of provisioning data 22 being generated, at least some of the information may be collected from one or more of the following types of users via a respective user interface: a system operator, a service provider, a system administrator for an enterprise (such as a customer of a service), or an end user (e.g., user associated with a particular email account/mailbox).

Access to the provisioning management application may be controlled using authentication factors, such as confirming a username and password of the user. Different users may be granted different levels of access and/or different levels of priority. As an example, a service provider may have access to provisioning data 22 for all of the enterprises that are customers of the service provider, a system administrator for a particular enterprise may have access to provisioning data 22 for all of the email accounts/mailboxes associated with that particular enterprise (but would not have access to provisioning data 22 of other enterprises), and an end user may only have access to provisioning data 22 specific to the end user's own email account/mailbox. To the extent that provisioning data 22 from one user may conflict with provisioning data 22 from another user, the provisioning management application may apply prioritization rules to resolve the conflict.

The provisioning management application of a data source 30 may provide the user with any suitable user interface. Certain embodiments implement the user interface as a fat client on a desktop. Certain embodiments implement the user interface as a web application. As an example, the provisioning management application may comprise one or more hosted services portals (HSPs) configured to collect information from the user according to an HTTP protocol. In certain embodiments, a web service provides the backend for the web application. The web service facilitates serving the user interface at the front end and/or managing interactions between components of the system over one or more interconnecting networks. As an example, the web service may be implemented as a REST API that is used by a Javascript, Ruby on Rails, Java JSP/Servlets or other management user interface. The web service may be implemented using any suitable computing model. For example, the web service may comprise a hosted, cloud-based, or software-as-a-service (SaaS) model provided using a data center, server, or other suitable hardware. In other embodiments, the web service may be replaced or augmented by another application that performs some or all of the functionality of the web service.

As mentioned above, the provisioning management application may collect information from one or more users and/or from one or more other systems. Examples of such systems include a Customer Relationship Management (CRM) system or a system that automates aspects of provisioning, for example, based on machine learning. In one embodiment, one of the data sources (e.g., data source 30A) may include a CRM system, such as a NetSuite CRM system managed by a service provider, and another one of the data sources (e.g., data source 30B) may include a customer-facing user interface. Suppose a customer purchases a service, such as an encryption service, an anti-virus service, an anti-spam service, etc. In response, the CRM system feeds provisioning data 22 to database 20 that allows the purchased service to be activated for the customer. At a later time (e.g., after the initial provisioning has been activated), a system administrator employed by the customer could login to the customer-facing user interface and add customer-specific policies for the service.

In certain embodiments, the information collected by the provisioning management application of data source 30 may comprise at least a portion of one or more policies (e.g., the information may comprise one or more rules of a policy or an entire policy). Policies may be developed manually, automatically (e.g., using machine learning), or both (e.g., a user provides initial policy information, machine learning updates the policy information, the user can review/override the policy information). Examples of policies for email may include encrypting, filtering, archiving, and/or branding policies. These policies may indicate content and/or metadata to be reviewed for an email or email attachment and actions to perform if the content and/or metadata matches or fails to match keywords or characteristics defined by the policy.

For example, an encryption policy may indicate which emails require encryption, a type of encryption to be applied, an encryption key to be used, and/or other encryption-related rules. A filter policy may indicate which emails require filtering, which filter(s) to apply (e.g., antivirus, anti-spam), which actions to take (e.g., quarantine the email, discard the email after a certain period of inaction, perform a malware scan and attempt to remediate the email, etc.), and/or other filter-related rules. An archiving policy may indicate which emails require archiving, where and/or for how long to store an email (e.g., so that an important email can be accessed from a database or file management system in the future), and/or other archiving-related rules. A branding policy may indicate which emails require branding, which branding to use, such as a business logo or trade dress, a designation (e.g., "confidential," "proprietary," "draft"), a watermark (e.g., recipient's name, date, or other metadata), etc., and/or other branding-related rules.

In general, provisioning manager 40 facilitates provisioning one or more service instances 50. In certain embodiments, provisioning manager 40 includes a configuration file generator 42, a repository 44, and a notification module 46. Configuration file generator 42 obtains provisioning data 22 from database 20. In certain embodiments, configuration file generator 42 may retrieve provisioning data 22 from database 20 in response to receiving a notification that provisioning data 22 has been added, modified, or removed in database 20, for example, as described below with respect to FIG. 2 and FIG. 3. In addition, or in the alternative, certain embodiments of configuration file generator 42 may periodically poll database 20 to determine whether any provisioning data 22 has been added, modified, or removed compared to previous provisioning data 22. Polling may be performed at a pre-determined periodicity, such as every X time units (where X may be 1, 2, 5, 10, 15, 20, 30, 45, 60, or other suitable number and the time units may be seconds, minutes, hours, or other suitable time unit). Optionally, polling may be performed in response to the occurrence of a pre-determined event, such as in response to determining that an error has occurred (e.g., based on messaging received from another component or based on information indicated in a log file).

Configuration file generator 42 may then prepare a configuration file based on provisioning data 22 that has been added, modified, or removed. Examples of preparing a configuration file include creating a new configuration file or updating an existing configuration file. The configuration file indicates how to provision one or more service instances 50 to send or receive electronic messages.

Configuration file generator 42 facilitates providing the configuration file to the one or more service instances 50. In certain embodiments, configuration file generator 42 stores configuration files in repository 44 from which the one or more service instances 50 obtain the configuration file, for example, using file distribution technology. Examples of file distribution technology include source code or version control repositories, such as Git, J/Git, Concurrent Version System (CVS), Subversion (SVN), Mercurial, Team Foundation Server (TFS) version control or source control, Clearcase, or SourceSafe. Examples of file distribution technology further include object stores, such as Ceph or Simple Storage Service (S3).

Notification module 46 determines that configuration file generator 42 has committed the configuration file to repository 44. For example, notification module 46 may determine that configuration file generator 42 has committed the configuration file to repository 44 based on receiving an indication from configuration file generator 42 (or from software or other computing components associated with repository 44), or notification module 46 may otherwise detect when the configuration file has been committed to repository 44. In response to determining that configuration file generator 42 has committed the configuration file to repository 44, notification module 46 sends a notification to one or more service instances 50. The notification indicates that repository 44 contains a new or updated configuration file.

In certain embodiments, notification module 46 may send the notification to a subset comprising only the one or more service instances 50 to which the new or updated configuration file applies. In certain embodiments, notification module 46 may send the notification both to service instances 50 to which the new or updated configuration applies as well as to service instances 50 to which the new or updated configuration does not apply. In certain embodiments, the notification may include information that enables a service instance 50 to determine whether the new or updated configuration file applies to it. As an example, the notification may indicate a topic related to the new or updated configuration file. The service instance 50 may retrieve the new or updated configuration file if the topic is relevant to the service instance 50. The service instance 50 may abstain from retrieving the new or updated configuration file if the topic is not relevant to the service instance 50. In this manner, unnecessary calls to repository 44 may be reduced.

Notification module 46 may communicate notifications according to any suitable type of messaging. Examples of types of messaging include a queue-based messaging and publisher/subscriber messaging. Certain embodiments may support a single messaging model, and other embodiments may support multiple messaging models (e.g., some notifications may be sent according to a message queue model and other notifications may be sent according to a publisher/subscriber model, for example, depending on the type of notification). In queue-based messaging, notification module 46 sends the notification to one or more queues, each queue associated with a respective service instance 50. The queues may allow for asynchronous communications in that provisioning manager 40 and service instance 50 do not need to interact with the queue at the same time. Rather, provisioning manager 40's notification module 46 may place a notification onto service instance 50's queue, and the queue stores the notification until the notification is processed by service instance 50. The queue-based messaging technique may be useful in embodiments in which notification module 46 sends the notification to a subset comprising only the one or more service instances 50 to which the new or updated configuration file applies. For example, notification module 46 may maintain a mapping between each service instance 50 and that service instance 50's respective queue. Notification module 46 determines the service instance(s) 50 to which any new or updated configuration files apply and sends a notification to the queue(s) associated with the determined service instance(s) (without sending the notification to the queue(s) associated with the other service instance(s)).

In publisher/subscriber messaging (abbreviated "pub/sub"), publishers push notifications to subscribers. Publisher/subscriber messaging may allow for providing instant event notifications to distributed applications (such as applications comprising small, independent building blocks that are decoupled and distributed over a network). The publisher/subscriber model may include three components: 1) one or more publishers, 2) one or more subscribers, and 3) communication infrastructure.

In some embodiments, a publisher (e.g., provisioning manager 40) categorizes notifications into classes/categories, such as topic or content-based categories, and publishes the notifications to the communication infrastructure.

In some embodiments, a subscriber (e.g., service instance 50) subscribers to a class/category of notifications so that the subscriber may receive and process notifications associated with the category to which the subscriber subscribes. The subscriber need not process notifications associated with categories to which the subscriber does not subscribe. Optionally, in some embodiments, the subscriber need not even receive notifications associated with categories to which the subscriber does not subscribe.

In some embodiments, a communication infrastructure receives notifications from publishers and delivers notifications to subscribers. The communication infrastructure may be implemented using any suitable network or portion thereof including, for example, the communication path between provisioning manager 40's notification module 46 and service instance 50's notification module 56. In some embodiments, the communication infrastructure maintains subscribers' subscriptions. As an example, the communication infrastructure may determine whether to deliver a notification to a subscriber based on whether the subscriber is subscribed to a channel or topic associated with the notification. Alternatively, in some embodiments, the communication infrastructure may deliver all notifications to the subscriber, and the subscriber may determine whether to receive and process the notification based on whether the subscriber is subscribed to a channel or topic associated with the notification.

In some embodiments, a publisher has one input channel that splits into multiple output channels, one for each subscriber. Subscribers can express interest in one or more categories and only receive notifications that are of interest. The publisher and subscriber need not be aware of each other. For example, the publisher may send notifications to subscribers without knowing if any subscribers are actually there. Similarly, the subscriber receives notifications without requiring explicit knowledge of the publishers. If there are no subscribers to receive topic-based information, the notification can be dropped. This loose-coupling between publishers and subscribers (where publishers do not need to know the identities of the subscribers) may allow for increased flexibility compared to systems that require configuring subscribers to know such information. This may allow for greater network scalability and a more dynamic network topology.

When sending a notification, provisioning manager 40 may indicate one or more topics associated with the notification. The one or more topics indicate that service instance (s) 50 that subscribe to one or more of the topic(s) associated with the notification are to receive and process the notification. Some use channels to indicate the one or more topics associated with a notification. For example, in some embodiments, the publisher creates a named channel for each topic, and each subscriber subscribes to one or more named channels of interest to the subscriber. The publisher publishes notifications for a given topic to the named channel(s) associated with that topic. The notifications can be published in response to the occurrence of an event related to the topic. As an example, the publisher may publish a notification to the named channel for topic X in response to the occurrence of an event that commits a configuration file for topic X to a repository. In this manner, whenever the publisher publishes a notification for a topic, a subscriber that is interested in that topic receives the notification via one of the named channels to which the subscriber is subscribed.

As discussed above, a service instance 50 can be configured as a subscriber. For example, when service instance 50 is created, service instance 50 can subscribe to one or more topics that are needed to allow service instance 50 to work properly and/or one or more topics that are otherwise of interest to service instance 50 (depending on what type of service instance it is). Service instance 50 need not subscribe to topics that are not of interest to that type of service instance. As an example, an encryption service instance may subscribe to domain-related topics, encryption policy topics, and/or an encryption key topic (such as a topic that allows for distributing one or more encryption keys to the encryption service instance so that the encryption service instance can use the encryption key(s) to perform encryption or decryption). As another example, a threat protection service instance may subscribe to domain-related topics and/or threat protection policy topics (such as an anti-virus policy topic). In this manner, whenever service instance 50 needs to know about a configuration change (e.g., based on a change to provisioning data 22), provisioning manager 40 can create a configuration file, commit the configuration file to a repository 44, and notify service instance(s) 50 that subscribe to the relevant topic. This model may reduce the amount of time it takes to propagate a change to service instance 50 and/or improve efficiency compared to polling systems that would otherwise have to constantly check for changes (even during time periods when changes are unlikely to occur, such as at night when a user responsible for updating provisioning data 22 in database 20 would not typically be making changes).

Although certain examples described above have used topic-based classes/categories for filtering notifications, other embodiments may use other classes/categories for filtering notifications. For example, some embodiments may use content-based classes categories where a notification is only delivered to and/or processed by a subscriber if the notification matches constraints/criteria defined by the subscriber.

Notification module 46 may be implemented using any suitable notification architecture. Certain embodiments may use message-oriented middleware (MOM) to implement notifications. MOM may comprise software, middleware, and/or hardware that supports communicating notifications between components of a system. In certain embodiments, MOM may support asynchronous calls between the components. MOM may be used in distributed systems made up of diverse components. For example, MOM may provide a middleware layer that allows software components that run on different platforms to interact with one another. The middleware layer insulates application developers from the details of the various operating systems and network interfaces of the different platforms, which reduces the complexity of developing applications that span multiple platforms.

Notification module 46 may use any suitable messaging implementation. Examples may include, but are not limited to, Amazon Web Services (AWS) Simple Queue Service (SQS), AWS Simple Notification Service (SNS), Azure Service Bus, Java Message Service (JMS), IBM message queue (MQ), and Websphere MQ.

The system may include any suitable number of service instances 50, such as service instance 50A, 50B, . . . 50N. In general, a service instance 50 comprises software that can be configured using one or more configuration files (e.g., one or more plain text files). As an example, a service instance 50 may comprise an email application or a feature of the email application, such as an encryption policy, an antivirus filter, an anti-spam filter, etc.

A service instance 50 may include (or may communicate with) a configuration module 52 that configures service instance 50 based on one or more configuration files. Configuration module 52 obtains a configuration file from repository 44. For example, service instance 50 may include a notification module 56 that receives a notification from notification module 46 of provisioning manager 40 and, in response, prompts configuration module 52 to retrieve one or more new or updated configuration files that are applicable to service instance 50. In certain embodiments, notification module 56 receives the notifications via a message queue associated with service instance 50. In certain embodiments, notification module 56 of service instance 50 is configured as a subscriber that receives notifications published by notification module 46 of provisioning manager 40. If the notification includes a topic, notification module 56 may determine whether to prompt configuration module 52 to retrieve the configuration file(s) depending on whether the topic is relevant to service instance 50.

In addition, or in the alternative to using notification module 56, configuration module 52 may periodically poll repository 44 to determine whether repository 44 contains a new or updated configuration file for service instance 50. Polling may be performed at a pre-determined periodicity, such as every X time units (where X may be 1, 2, 5, 10, 15, 20, 30, 45, 60, or other suitable number and the time units may be seconds, minutes, hours, or other suitable time unit). In certain embodiments, the periodicity may be relatively infrequent (e.g., polling may be performed occasionally as a backup method in case a problem occurs with the notification-based method, but not so often as to consume excessive bandwidth with unnecessary calls to the repository). Optionally, polling may be performed in response to the occurrence of a pre-determined event, such as in response to determining that an error has occurred (e.g., problems sending one or more emails, receiving an error message from another component, etc.). If repository 44 contains a new or updated configuration file for service instance 50, configuration module 52 pulls the configuration file and applies the configuration file to service instance 50.

Continuing with the example in which service instance 50 provides an email application, the configuration file may include information for provisioning email, such as an identification of one or more domains (e.g., the names or addresses of realms within a network, such as the names or addresses of computer systems associated with a particular enterprise within the Internet), domain mapping information (e.g., domain to hostname mappings for downstream email routing), an identification of one or more clients (e.g., email readers or mail user agents (MUA) comprising computer programs used to access and manage a user's email), mail relay configuration data (e.g., domains allowed to send emails through service instance 50 or through a gateway running service instance 50), mail transport configuration data (e.g., transport layer security (TLS) keys, TLS domain overrides), identification of enterprise codecs (e.g., computer programs that encode or decode data), identifiers needed to associate logs or reporting data with an enterprise, email policy data for an enterprise (e.g., email patterns to match, actions to perform on matched email with necessary data such as branding text, routing rules, encryption rules, encryption keys, etc.), and/or other suitable information. In certain embodiments, the email application may send and/or receive messages according to Simple Mail Transfer Protocol (SMTP).

Service instances 50 may be configured in multi-tenant implementations or single-tenant implementations. Certain embodiments of multi-tenant service instances 50 run on the same gateway. The gateway hosts email services and can process email for multiple enterprises so that each enterprise does not require its own on-site gateway. Configuration files can be customized to different service instances 50 running on the same gateway. For example, a first service instance 50 running on the gateway may be configured with an encryption policy for a first enterprise, and a second service instance 50 running on the gateway may be configured with a different encryption policy for a second enterprise.

Certain embodiments include a certificate manager 60. Certificate manger 60 manages certificates that service instances 50 may use to encrypt or decrypt messages, provide TLS, etc. Certificate manager 60 comprises a certificate server 62 configured to add certificates and activate certificates. Certificate manager 60 also comprises a certificate listener 64 configured to approve certificates.

Although FIG. 1 illustrates one arrangement of components, other embodiments may include more, fewer, or different components configured to perform the operations described herein, and the components may be integrated or separate in any suitable manner. As an example, the system may include additional components, such as components to support additional traffic, facilitate load balancing, or provide backup in case one of the components requires maintenance or experiences a failure. Although the previous description describes pulling configuration files from repository 44 of provisioning manager 40 to configuration module 52 of service instance 50, other embodiments may push the configuration files from provisioning manager 40 to service instance 50. For example, each service instance 50 could expose an interface configured to accept configuration files.

The system described in FIG. 1 may be implemented using any suitable file distribution technology. In one example, the system described in FIG. 1 may be implemented using Git technology. For example, provisioning manager 40 may be located offsite (as opposed to at a user's premises) and may be used to manage clients, domains, and policies via a management user interface that stores its data in a relational database (e.g., database 20 comprising provisioning data 22, such as data for provisioning a policy). Provisioning manager 40 periodically polls database 20 to determine any changes to provisioning data 22, such as any additions, removals, or updates of domains, clients, encryption policies, etc. If provisioning data 22 has changed, provisioning manager 40 will prepare (e.g., create or update) a configuration file indicating the change, and provisioning manger 40 will then commit the configuration file to the Git repository.

As an example, if the provisioning data 22 that has changed comprises policy data, provisioning manager 40 will prepare a configuration file that includes client-specific policies for the client and commit the configuration file to the Git repository. As another example, if the provisioning data 22 that has changed indicates that a new domain has been added or removed, provisioning manager 40 will prepare a configuration file that updates the domain-to-client mapping and commit the configuration file to the Git repository. Provisioning manager 40 may also update related transport information (e.g., postfix transport file), whether in the same configuration file or a separate configuration file. As another example, if the provisioning data 22 that has changed indicates that a client has been removed, provisioning manager 40 will prepare one or more configuration files that remove policies specific to the client, update the domain-to-client mapping, and update related transport information. Provisioning manager 40 will then commit the one or more configuration files to the Git repository.

In certain embodiments, the directory structure of the Git repository may match the expected directory structure of service instance 50. Service instance 50 may run a background task that periodically executes a pull request on the Git repository. This will propagate changes made by provisioning manager 40 down to the corresponding service instance 50.

Figure 2:
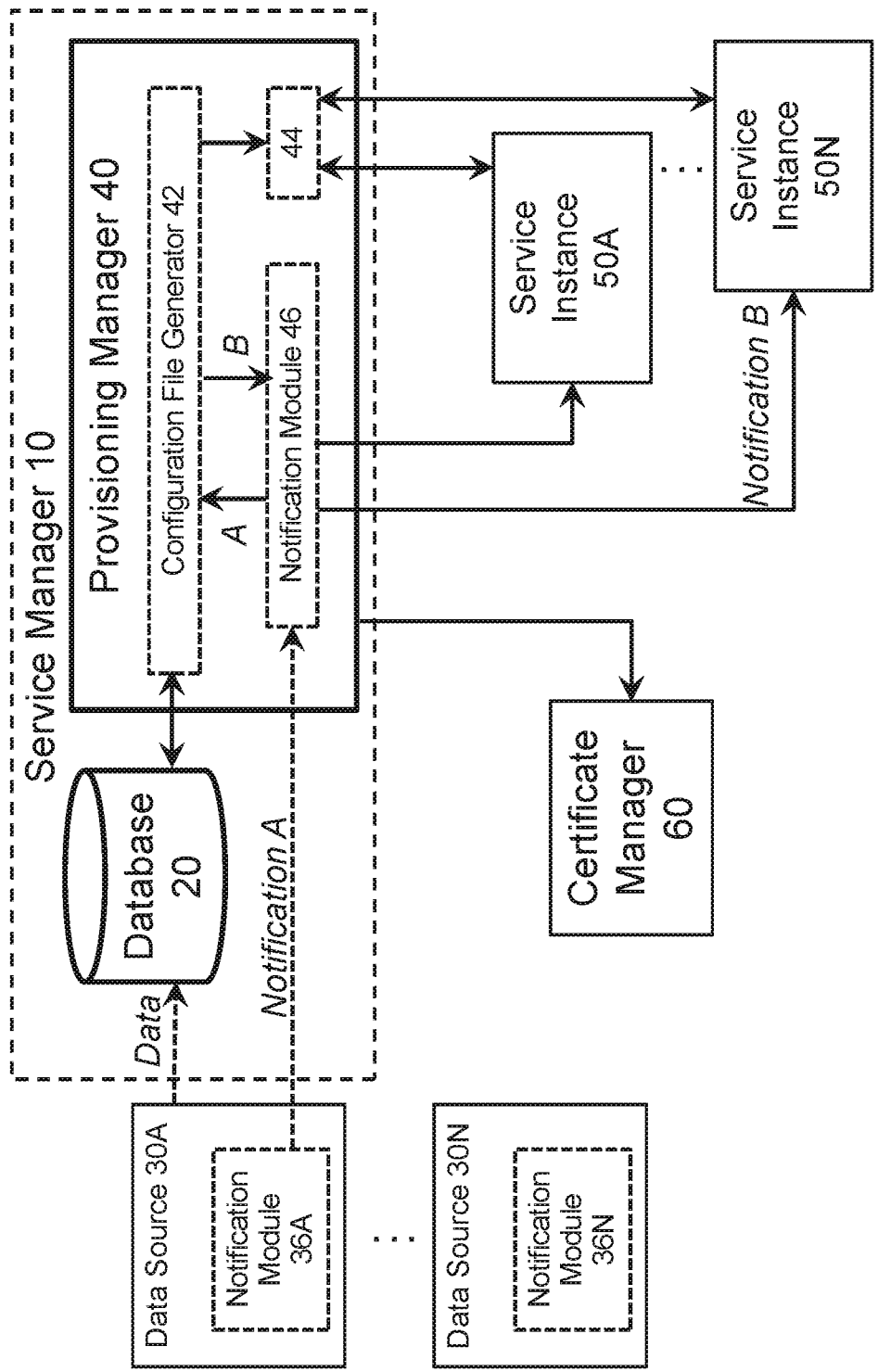
FIG. 2 illustrates an example of a system for provisioning a service instance, according to certain embodiments.
Figure 3:
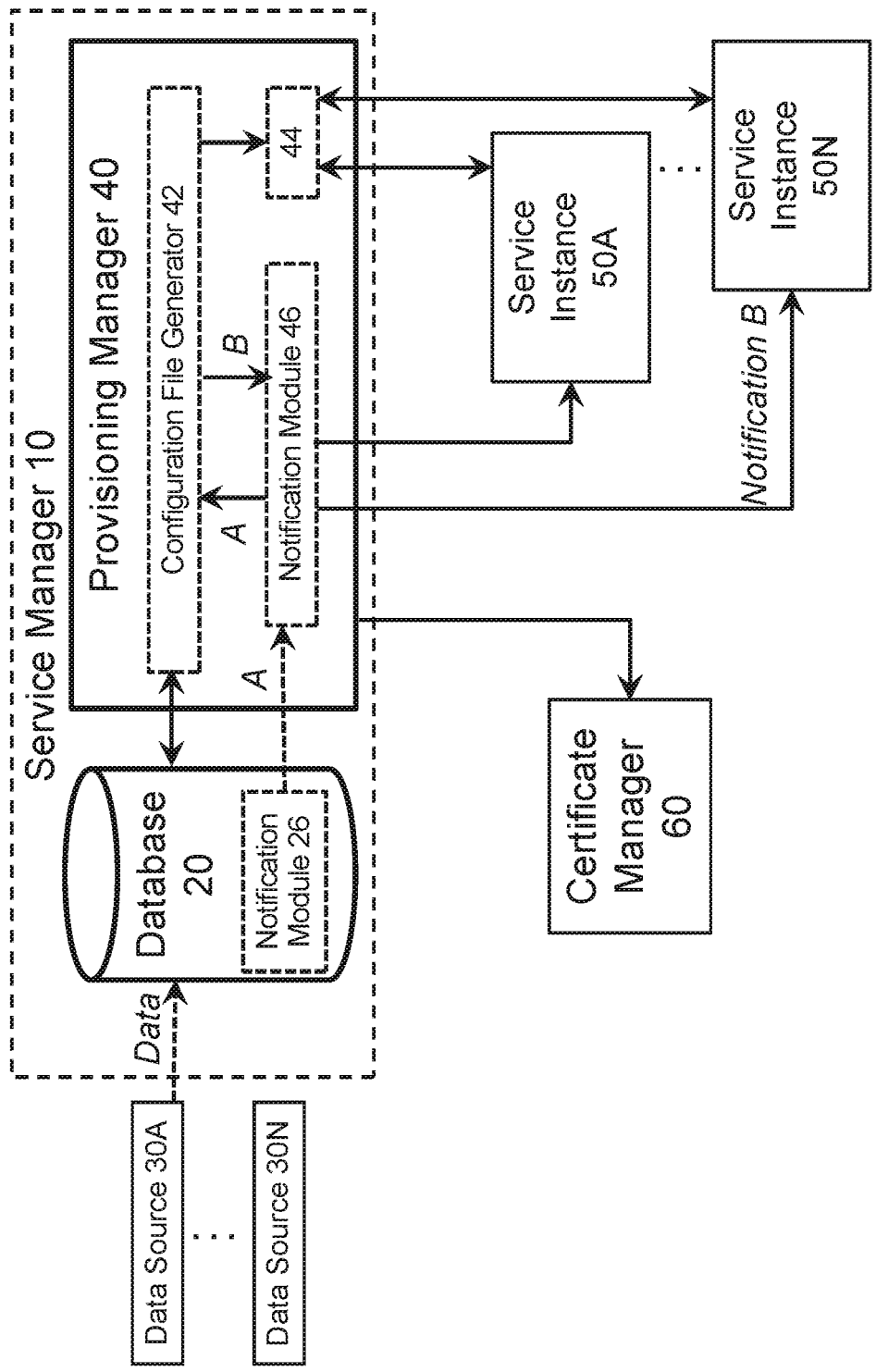
FIG. 3 illustrates an example of a system for provisioning a service instance, according to certain embodiments.

FIGS. 2 and 3 illustrate examples in which provisioning manager 40 obtains provisioning data 22 in response to receiving a notification indicating that the provisioning data 22 has been added, modified, or removed in the provisioning database. For example, FIG. 2 illustrates an example of a system similar to that described with respect to FIG. 1. FIG. 2 further illustrates that a data source 30 may include a notification module 36. For example, when data source 30 adds, modifies, or deletes provisioning data 22 in database 20, a notification (e.g., notification A) may be sent from notification module 36 of data source 30 to notification module 46 of provisioning manager 40. Communications between notification module 36 and notification module 46 may use any suitable type of messaging, such as queue-based messaging or publisher/subscriber messaging. In response to receiving notification A, notification module 46 may prompt configuration file generator 42 to pull the provisioning data 22 from database 20. As discussed with respect to FIG. 1, configuration file generator 42 prepares a configuration file based on the provisioning data 22 and commits the configuration file to repository 44. Configuration file generator 42 may signal to notification module 46 that the configuration file has been made available in repository 44, which may prompt notification module 46 to send a notification (e.g., notification B) to one or more service instances 50 (e.g., via the notification module(s) 56 associated with the service instance(s) 50).

FIG. 3 illustrates an example of a system similar to that described with respect to FIG. 1. FIG. 3 further illustrates that a database 20 may include a notification module 26. For example, when data source 30 adds, modifies, or deletes provisioning data 22 in database 20, a notification (e.g., notification A) may be sent from notification module 26 of database 20 to notification module 46 of provisioning manager 40. Communications between notification module 26 and notification module 46 may use any suitable type of messaging, such as queue-based messaging or publisher/subscriber messaging. In response to receiving notification A, notification module 46 may prompt configuration file generator 42 to pull the provisioning data 22 from database 20. As discussed with respect to FIG. 1, configuration file generator 42 prepares a configuration file based on the provisioning data 22 and commits the configuration file to repository 44. Configuration file generator 42 may signal to notification module 46 that the configuration file has been made available in repository 44, which may prompt notification module 46 to send a notification (e.g., notification B) to one or more service instances 50 (e.g., via the notification module(s) 56 associated with the service instance(s) 50).

Figure 4:
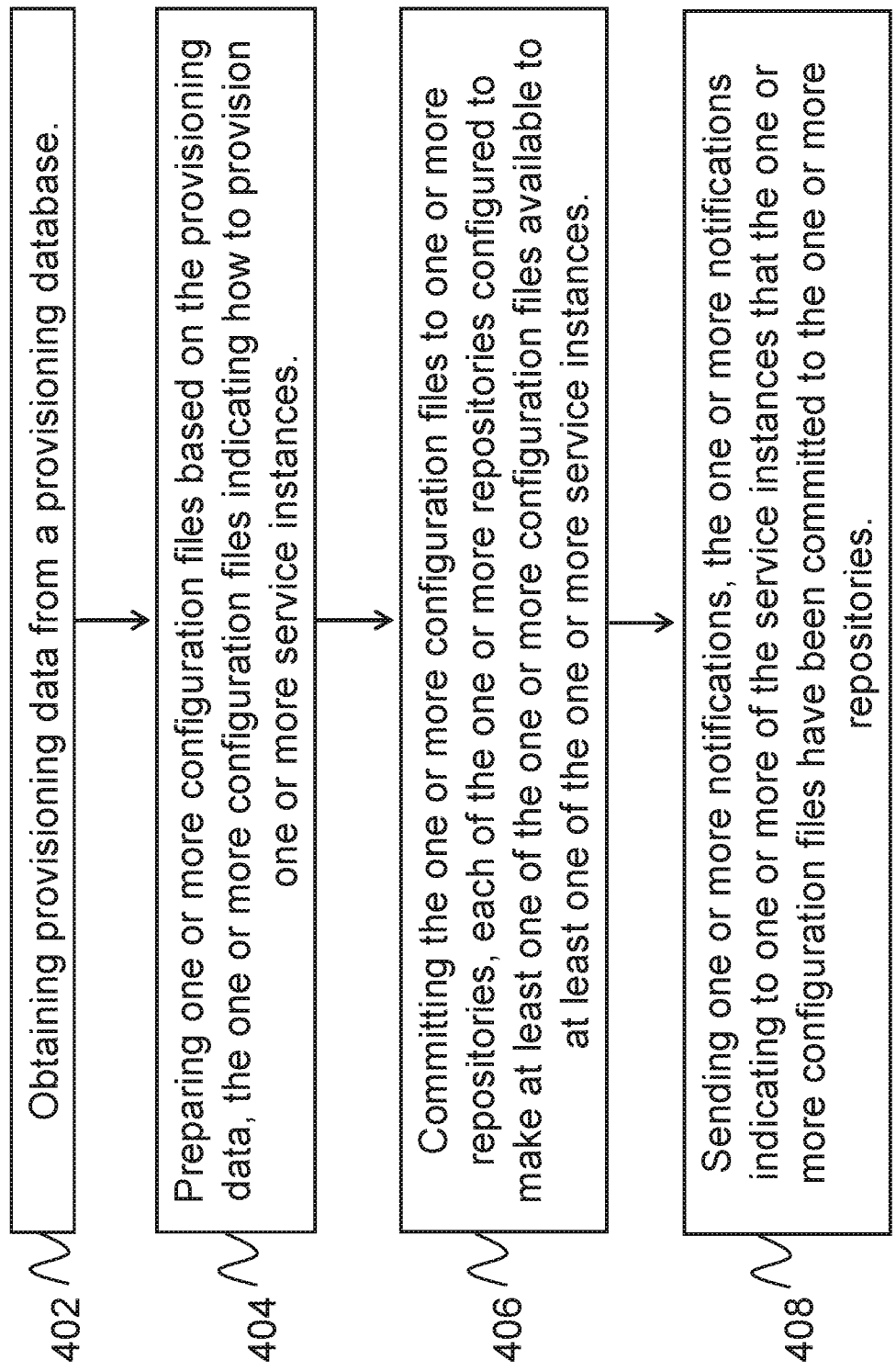
FIG. 4 illustrates an example of a method that may be performed by a provisioning manager, according to certain embodiments.

FIG. 4 illustrates an example of a method that may be performed by a provisioning manager, such as provisioning manager 40 of any of FIGS. 1-3, according to certain embodiments. The method shown in FIG. 4 begins at step 402 with provisioning manager 40 obtaining provisioning data 22 from provisioning database 20. For example, provisioning manager 40 may periodically poll the provisioning database 20 to identify new provisioning data 22, or provisioning manger 40 may retrieve new provisioning data 22 in response to receiving a notification (e.g., notification A from data source 30 in FIG. 2 or notification A from database 20 in FIG. 3). In certain embodiments, the new provisioning data 22 includes provisioning data 22 that has been added, removed, or changed in the provisioning database 20 compared to previous provisioning data. If provisioning manager 40 does not possess previous provisioning data (such as when provisioning manager 40 is first initialized), the new provisioning data 22 may include all of the provisioning data 22 from provisioning database 20.

At step 404, provisioning manager 40 prepares one or more configuration files based on the provisioning data 22 obtained in step 402. A configuration file indicates how to provision one or more service instances 50 to provide a service. As an example, to provision an email service, the configuration file indicates how to provision one or more service instances 50 used in sending or receiving electronic messages.

Preparing a configuration file may comprise creating a new configuration file or updating an existing configuration file. Preparing the configuration file may comprise one or more of the following:

Determining which provisioning data 22 to provide to a service instance 50. For example, provisioning manager 40 may determine which provisioning data 22 both corresponds to service instance 50 and is new/changed.

Determining whether to include any additional data to assist the service instance 50 in applying the provisioning data 22. In certain embodiments, the additional data provides context for the new provisioning data 22. As an example, provisioning manager 40 may include additional data indicating downstream configurations that may be affected by the new provisioning data 22.

Formatting the configuration file according to a format that the service instance 50 is able to use for provisioning. As an example, provisioning manager 40 may have knowledge of a directory structure used by service instance 50 and may format the configuration file according to the directory structure. As another example, provisioning manager 40 may have knowledge of a file structure used by service instance 50 and may format the configuration file according to the file structure. For example, if service instance 50 uses a table structure with rows and columns arranged in a particular order, provisioning manager 40 may prepare the configuration file to provide the table with the rows and columns arranged in the proper order.

Indicating one or more service instances 50 to which the configuration file applies. For example, the configuration file may be associated with an identifier that indicates a service instance 50 to which the configuration file applies. As an example, the identifier may identify a topic in order to indicate that the configuration file applies to service instance(s) 50 that subscribe to the topic. As another example, the identifier may identify one or more message queues, each message queue associated with a service instance 50 to which the configuration file applies. In some embodiments, the identifier may be included as content of the configuration file itself or as metadata associated with the configuration file.

Provisioning manager 40 may use any suitable techniques for preparing the configuration file. In certain embodiments, provisioning manager 40 has knowledge about information to include in the configuration file and how to format the information so that the configuration file can be used by a specific service instance 50. Examples of ways to prepare configuration files include:

Expanding an existing configuration file using a configuration file template. The configuration file template may be customized for a specific type of service instance 50. For example, a template for a service instance 50 that executes an email application may include fields for identification of one or more domains, domain mapping information, an identification of one or more clients, mail relay configuration data, mail transport configuration data, identification of enterprise codecs, identifiers needed to associate logs or reporting data with an enterprise, email policy data, antivirus filter data, anti-spam filter data, and/or other suitable information.

Creating a name-value pair mapping for an application where the names are configuration variables required by the service instance, such as hostnames for upstream or downstream services, database credentials, connection pool parameters, etc.

Creating a yaml, json, or xml file with provisioning data for a service instance.

In certain embodiments, provisioning manager 40 can delegate preparation of the configuration file to one or more pluggable modules specific to the service instance 50 (such as pluggable modules that can prepare configuration files for specific applications executed by the service instance 50). In certain embodiments, the pluggable modules may have knowledge about how provisioning data 22 is organized in database 20 and may use this knowledge to facilitate retrieving provisioning data 22 from database 20. For example, the pluggable modules may use a relational table that facilitates navigating a relational database.

In certain embodiments, provisioning manager 40 has at least one pluggable module for each type of configuration file that provisioning manager 40 needs to prepare. Each enterprise could be assigned one or more services. Examples of services may include an email exchange service provided by a multi-tenant gateway, an email exchange service provided by a single-tenant gateway, a data loss prevention service provided by a DLP appliance, an email blocking service provided by a security appliance, or other types of hosted services. The service maps to a set of configuration files for the service instances 50. Provisioning data 22 would be segregated appropriately in database 22 such that provisioning manager 40 would obtain provisioning data 22 specific to the service instance 50 for which the associated configuration file is being prepared.

At step 406, provisioning manager 40 commits the one or more configuration files to one or more repositories 44. Each of the one or more repositories 44 is configured to make at least one of the one or more configuration files available to at least one of the one or more service instances 50. Committing the one or more configuration files to the one or more repositories 44 allow services instances 50 to obtain the configuration files using file distribution technology. Examples of repositories 44 include source code control repositories, version control repositories, and object stores used in file distribution technology.

In certain embodiments, at least one of the repositories 44 enables each of the one or more service instances 50 to pull any of the one or more configuration files that correspond to that service instance 50. FIG. 1 illustrates an example in which repository 44 is associated with provisioning manager 40 and each service instance 50 can pull its respective configuration file(s) from repository 44. Configuration files may be stored in a manner that allows each service instance 50 to locate the configuration file(s) that are applicable to that service instance 50, as examples:

- A configuration file may be stored according to a filename that follows a naming convention. The naming convention allows a service instance 50 to determine whether the configuration file is applicable to that service instance 50. As an example, in some embodiments, the naming convention may indicate a topic (such as encryption, quarantine, antivirus, anti-spam, archiving, branding, etc.), a system (such as enterprise A or enterprise B), and/or other characteristics associated with the service instance(s) 50 to which the configuration file is applicable;
- A configuration file may be stored in a location within repository 44 that allows a service instance 50 to determine whether the configuration file is applicable to that service instance 50. As an example, a directory within repository 44 may be specific to a particular service instance 50 (or set of service instances 50) such that storing the configuration file in that directory implicitly indicates the service instance(s) 50 to which the configuration file is applicable; and/or
- An identifier included as content of the configuration file itself or as metadata associated with the configuration file can be used to indicate the service instance(s) 50 to which the configuration file is applicable.

At step 408, provisioning manager 40 sends one or more notifications. The one or more notifications indicate to one or more of the service instances 50 that the one or more configuration files have been committed to the one or more repositories 44. As an example, a first notification may be sent to indicate to one or more service instances 50 that a first configuration file has been committed to one or more repositories 44.

In some embodiments, the first notification may be sent according to a publisher/subscriber model. The publisher/subscriber model may indicate one or more topics associated with the first notification. The one or more topics indicate which service instance(s) 50 are to receive and process the first notification (i.e., the service instance(s) 50 that subscriber to at least one of the topics associated with the first notification are to receive and process the first notification). Service instances 50 that do not subscribe to any topics associated with the first notification need not process the first notification (i.e., these service instances need not retrieve the first configuration file from repository 44).

Optionally, in some embodiments, service instances 50 that do not subscribe to any topics associated with the first notification need not even receive the first notification. For example, provisioning manager 50 may indicate a topic associated with the first notification by sending the first notification via a channel for the topic. In this manner, only service instance(s) 50 that subscribe to the channel for the topic will receive the first notification.

Alternatively, the first notification and the indication of the one or more topics associated with the first notification may be sent to all of the service instances 50. Any suitable indication may be used to indicate the one or more topics, such as a field within the first notification, metadata associated with the first notification, etc. Each service instance 50 may determine whether to receive and/or process the first notification (i.e., retrieve the first configuration file) depending on whether that service instance 50 subscribes to any of the topics associated with the first notification.

Any suitable technique may be used to determine the one or more topics to associate with the first notification. For example, prior to publishing the first notification, provisioning manager 40 determines one or more topics associated with the first notification based on one or more topics associated with the first configuration file (i.e., the configuration file to which the first notification relates). In some embodiments, content of the first configuration file itself or metadata associated with the first configuration file may be used to determine the one or more topics. Topics may be broad or granular, depending on the implementation. Thus, the publisher/subscriber model may be well-suited for multitenant environments because the topics can be tailored to distribute the configuration file to the particular service instance(s) 50 that need to know about the configuration.

- As an example, the one or more topics associated with the first notification may indicate that the first notification (and, therefore, the first configuration file) relates to at least one policy for handling electronic messages, such as at least one of: encryption policy, quarantine policy, antivirus filter policy, anti-spam filter policy, archiving policy, and branding policy. For example, a notification for an encryption policy topic may prompt an encryption service instance 50 (i.e., a service that subscribes to the encryption policy topic) to retrieve the configuration file from repository 44, but the notification for the encryption policy topic would not prompt service instances 50 that subscribe only to other topics (such as branding) to retrieve the configuration file from repository 44.
- As another example, the one or more topics of the first notification may indicate that the first configuration file relates to a particular domain, system, enterprise, etc. For example, a notification for an enterprise-specific topic may prompt service instances 50 within the enterprise (e.g., enterprise A) to retrieve the configuration file from repository 44, but the notification for the enterprise-specific topic would not prompt service instances 50 that subscribe only to topics of another enterprise (such as enterprise B) to retrieve the configuration file from repository 44.
- As another example, the first notification may indicate that the configuration file only applies to a combination of topics. As an example, the first notification may indicate that the configuration file only applies to a combination of a service type (e.g., encryption) and an enterprise (e.g., enterprise A). Thus, in the example, the notification may prompt service instances 50 that subscribe to both the encryption service type and enterprise A to retrieve the configuration file. However, service instances 50 that subscribe to the encryption topic but do not subscribe to enterprise A would not be prompted to retrieve the configuration file. Similarly, service instances 50 that subscribe to enterprise A but do not subscribe to the encryption topic would not be prompted to retrieve the configuration file.

Other examples of topics may include "policy changed," "domain changed," "domain name added," "key added," etc.

Certain embodiments of the publisher/subscriber model may be well-suited to systems in which one configuration file needs to be applied to many service instances 50 (one-to-many implementation).

In some embodiments, the first notification may be sent according to a message queue model (a model where each of the one or more service instances 50 is associated with a corresponding message queue). Prior to sending the first notification, provisioning manager 40 determines a subset of the one or more service instances 50 to which the first configuration file applies such that the first notification is sent to the message queue(s) corresponding to the subset of the one or more service instances 50 to which the first configuration file applies without sending the first notification to the message queue(s) corresponding to the other service instance(s) 50 to which the first configuration file does not apply.

As an example, if the configuration file comprises an encryption policy, provisioning manager 40 may send the notification to the message queues of each service instance 50 configured to provide encryption without sending the notification to service instances 50 configured to provide other services (such as branding).

As another example, if the configuration file comprises a configuration for a particular domain, system, enterprise, etc., such as enterprise A, provisioning manager 40 may send the notification to the message queues of each service instance 50 associated with enterprise A without sending the notification to message queues associated with other enterprises (e.g., enterprise B).

In other embodiments, provisioning manager 40 may use multiple factors to determine which message queues should be sent the notification. As an example, the multiple factors may include both service type (e.g., encryption) and enterprise (e.g., enterprise A). Thus, in the example, the notification may be sent to the one or more messages queues associated with service instances 50 that perform encryption for enterprise A without sending the notification to message queues associated with service instances 50 that perform other services for enterprise A (such as branding) or to any message queues associated with enterprise B (regardless of the service type).

Certain embodiments of the message queue model may be well-suited to systems in which one configuration file needs to be applied to one service instance 50 (one-to-one implementation).

Provisioning manager 40 may repeat the steps of FIG. 4 in order to update the configuration files. Suppose that provisioning manager 40 has previously prepared a first configuration file for a first service instance 50A. As an example, the first configuration file may be based on provisioning data 22 that originates from a first data source 30A (such as a CRM) and that provisioning manager 40 receives from database 20. After distributing the first configuration file to the first service instance 50A (e.g., by committing the first configuration file to repository 44), provisioning manager 40 may poll database 20 (e.g., periodically or in response to receiving notification A described with respect to FIG. 2 or FIG. 3) to obtain updated provisioning data 22 associated with the first service instance 50A. In some embodiments, the updated provisioning data 22 originates from a second data source 30B (such as a system administrator of an enterprise running service instance 50A). Provisioning manager 40 prepares a second configuration file (either an update to or a replacement for the first configuration file) based on the updated provisioning data 22 and provides the second configuration file to the first service instance 50A using the file distribution technology.

Figure 5:
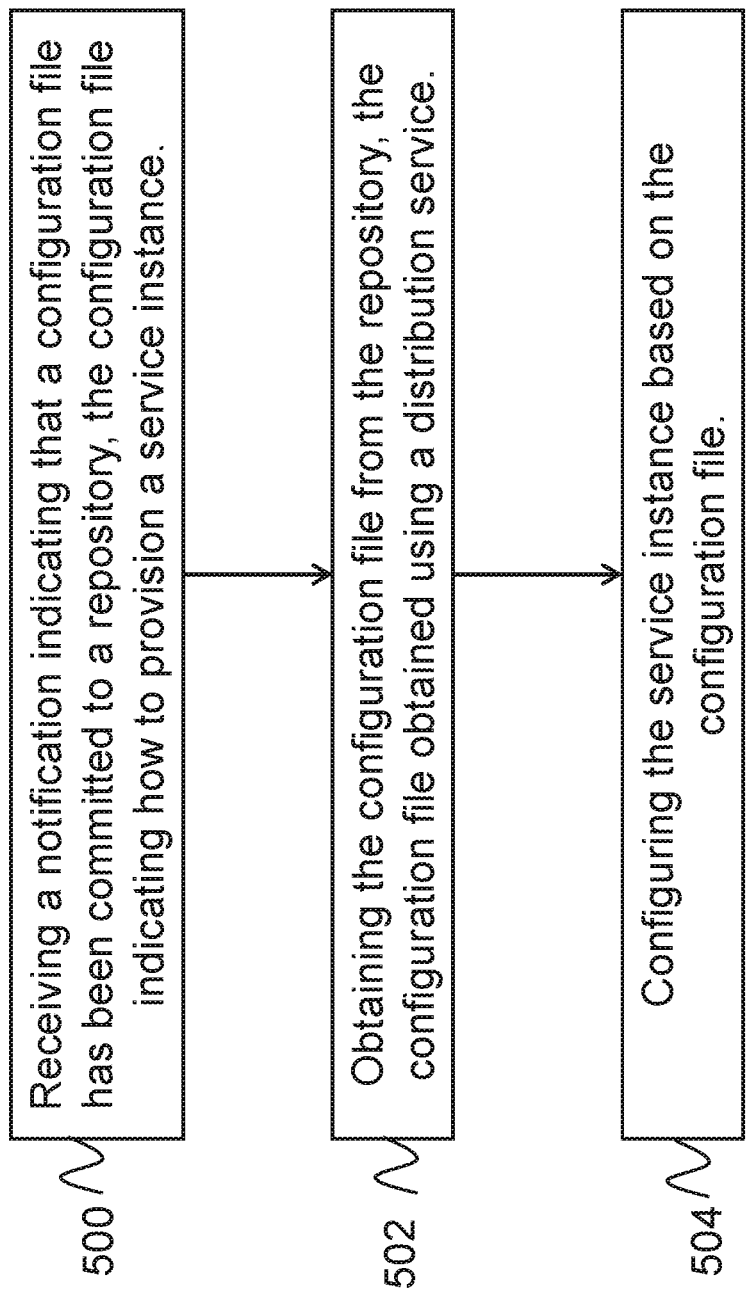
FIG. 5 illustrates an example of a method that may be performed by a service instance, according to certain embodiments.

FIG. 5 illustrates an example of a method that may be performed by a service instance, such as service instance 50 of any of FIGS. 1-3, according to certain embodiments. At step 500, service instance 50 receives a notification indicating that a configuration file has been committed to a repository 44. For example, the notification can be received from a provisioning manager 40 that manages repository 44. The configuration file indicates how to provision service instance 50.

As an example, in certain embodiments, service instance 50 receives the notification according to a publisher/subscriber model. In an embodiment of the publisher/subscriber model, the notification may be received from a publisher (e.g., provisioning manager 40), and the notification may include or otherwise indicate a topic. In certain embodiments, service instance 50 determines whether to process/act on the notification based on whether service instance 50 is subscribed to the topic. Suppose service instance 50 provides an encryption service. Service instance 50 may subscribe to an encryption policy topic, but need not subscribe to a branding policy topic. Thus, if the notification received in step 500 relates to the encryption policy topic, service instance 50 may proceed to step 502 to retrieve the configuration file associated with the encryption policy topic. However, if the notification received in step 500 relates to the branding policy topic, service instance 50 need not retrieve the configuration file associated with the branding policy topic.

In another embodiment of the publisher/subscriber model, service instance 50 has the option to subscribe to one or more of a plurality of channels. Each channel is associated with a topic. Service instance 50 receives notifications via the channel(s) to which it subscribes. Receiving a notification via a channel indicates that a configuration file has been made available for the topic associated with the channel. In response to receiving the notification, service instance 50 proceeds to step 502 to retrieve the configuration file.

As another example, in certain embodiments, service instance 50 receives the notification according to a message queue model. If a message queue associated with service instance 50 receives the notification, service instance 50 proceeds to step 502 to retrieve the configuration file.

At step 502, service instance 50 obtains the configuration file from the repository 44. Certain embodiments obtain the configuration file using file distribution technology, such as Git, J/Git, CVS, SVN, Mercurial, TFS, Clearcase, SourceSafe, Ceph, S3, etc. As an example, service instance 50 may determine a location (e.g., address) of repository 44 based on information received in the notification of step 500, or service instance 50 may be pre-configured with the location of repository 44 such that service instance 50 automatically accesses repository 44 in response to receiving a notification that is applicable to service instance 50. As described above, a notification applicable to service instance 50 may include, e.g., a notification for a topic to which service instance 50 subscribes (publisher/subscriber model), a notification received via a channel to which service instance 50 subscribes (publisher/subscriber model), or a notification directed to a message queue associated with service instance 50 (message queue model).

Service instance 50 may then retrieve the configuration file, for example, by performing a remote callback or pull operation (such as a Git pull). Service instance may identify the configuration file to be retrieved from repository 44 based on an identifier received in the notification or based on a pre-configured identifier. As an example, configuration files in repository 44 may follow a naming convention or may be stored in a directory within repository 44 that allows service instance 50 to identify which configuration files are applicable to it. Examples of configuration files that may be retrieved from the repository are described above with respect to FIGS. 1-4.

At step 504, service instance 50 is configured based on the configuration file obtained in step 502. As an example, if the configuration file includes a policy with rules for applying encryption to email, service instance 50 may encrypt emails according to the rules of the policy.

Figure 6:
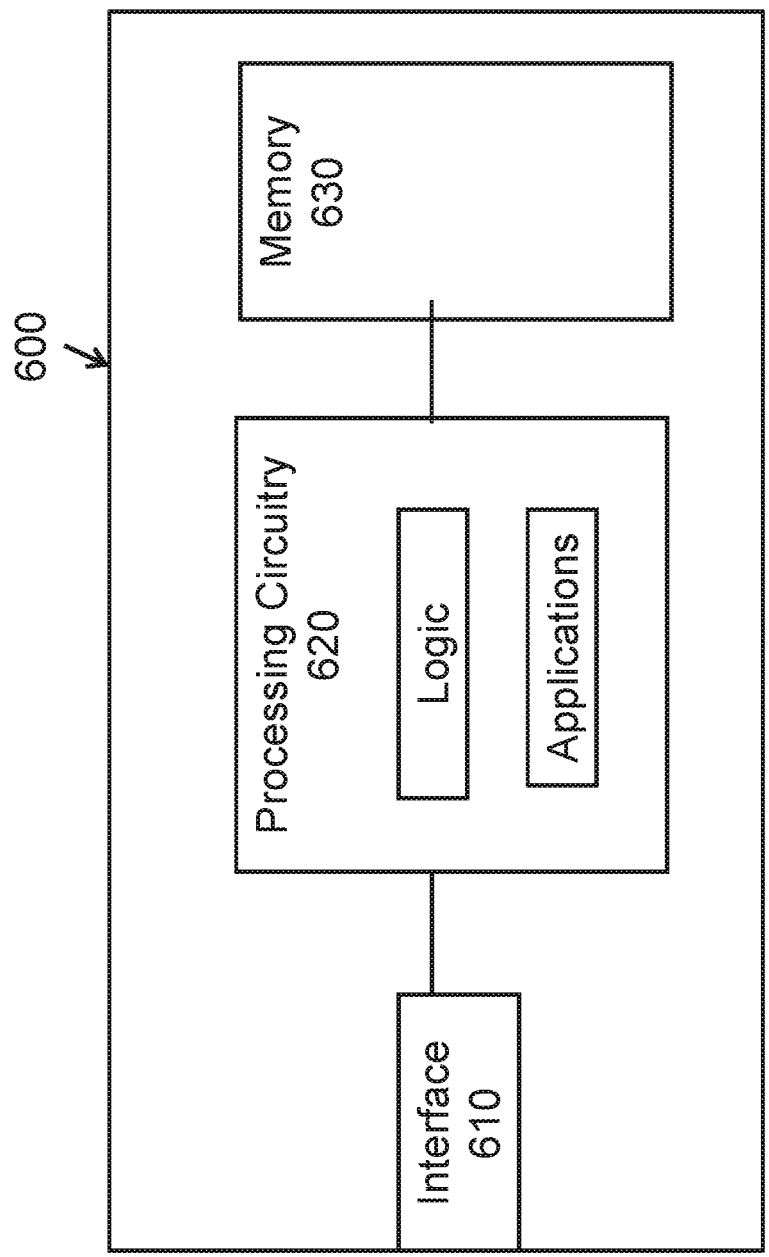
FIG. 6 illustrates an example of computing components that may be used to implement the system described in any of FIGS. 1-3, or any portion thereof, such as the provisioning manager or the service instance, according to certain embodiments.

FIG. 6 illustrates an example of computing components that may be used to implement the system described in FIG. 1, FIG. 2, FIG. 3, or any portion thereof, such as service manager 10, database 20, data source 30, provisioning manager 40, service instance 50, or certificate manager 60, according to certain embodiments. The computing components include one or more interface(s) 610, processing circuitry 620, memory(ies) 630, and/or other suitable element(s). Interface 610 receives input, sends output, processes the input and/or output, and/or performs other suitable operation. Interface 610 may comprise hardware and/or software.

Processing circuitry 620 performs or manages the operations of the component. Processing circuitry 620 may include hardware and/or software. Examples of a processing circuitry include one or more computers, one or more microprocessors, one or more applications, etc. In certain embodiments, processing circuitry 620 executes logic (e.g., instructions) to perform actions (e.g., operations), such as generating output from input. The logic executed by processing circuitry 620 may be encoded in one or more tangible, non-transitory computer readable media (such as memory 630). For example, the logic may comprise a computer program, software, computer executable instructions, and/or instructions capable of being executed by a computer. In particular embodiments, the operations of the embodiments may be performed by one or more computer readable media storing, embodied with, and/or encoded with a computer program and/or having a stored and/or an encoded computer program.

Memory 630 (or memory unit) stores information. Memory 630 may comprise one or more non-transitory, tangible, computer-readable, and/or computer-executable storage media. Examples of memory 630 include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

Certain embodiments of the present disclosure use file distribution technology. Traditionally, file distribution technology has been used to provide version management for software. For example, suppose members of a team of software developers are working on the same software module. A first team member may retrieve the software module from a repository, modify the software module, and save the modified software module in the repository. Another team member may retrieve the modified software module from the repository and resume work from where the first team member stopped.

Embodiments of the present disclosure differ from traditional uses of file distribution technology. Certain embodiments of the present disclosure use file distribution technology to facilitate provisioning a service. For example, certain embodiments use file distribution technology to commit a configuration file to a repository from which one or more service instances obtain the configuration file. The configuration provides provisioning information. Prior to committing the configuration file to the repository, certain embodiments prepare the configuration file, for example, by performing one or more of: obtaining provisioning data, determining which provisioning data to provide to a service instance, determining whether to include any additional data to assist the service instance in applying the provisioning data, formatting the configuration file according to a format that the service instance is able to use for provisioning, and/or indicating one or more service instances to which the configuration file applies.

According to certain embodiments, a provisioning manager comprises an interface and processing circuitry. The interface is configured to obtain provisioning data from a provisioning database. The processing circuitry is configured to prepare one or more configuration files based on the provisioning data and provide the one or more configuration files to one or more service instances using file distribution technology. The one or more configuration files indicate how to provision the one or more service instances used in sending or receiving electronic messages.

According to certain embodiments, a non-transitory computer readable medium stores logic that, when executed by processing circuitry of a provisioning manager, is operable to cause the provisioning manager to perform actions comprising obtaining provisioning data from a provisioning database, preparing one or more configuration files based on the provisioning data, and providing the one or more configuration files to one or more service instances using file distribution technology. The one or more configuration files indicate how to provision the one or more service instances used in sending or receiving electronic messages.

According to certain embodiments, a method comprises obtaining provisioning data from a provisioning database, preparing one or more configuration files based on the provisioning data, and providing the one or more configuration files to one or more service instances using file distribution technology. The one or more configuration files indicate how to provision the one or more service instances used in sending or receiving electronic messages.

Certain embodiments of the above-described provisioning manager, computer readable medium, and/or method may include one or more additional features, such as any one or more of the following:

In some embodiments, providing the one or more configuration files to the one or more service instances using file distribution technology comprises initiating storing the one or more configuration files in one or more repositories. Each of the one or more repositories is configured to make at least one of the configuration files available to at least one of the service instances.

In some embodiments, preparing the one or more configuration files comprises periodically polling the provisioning database, identifying new provisioning data based on polling the provisioning database, and preparing the one or more configuration files based on the new provisioning data. The new provisioning data indicates data that has been added, removed, or changed in the provisioning database.

In some embodiments, the one or more configuration files comprise a first configuration file prepared for a first service instance of the one or more service instances.

In some embodiments, preparing the first configuration file comprises determining whether to include any additional data to assist the first service instance in applying the provisioning data, formatting the configuration file according to a format that the first service instance is able to use for provisioning, and indicating that the first configuration file applies to the first service instance of the one or more service instances.

In some embodiments, preparing the first configuration file comprises delegating to a pluggable module customized to prepare the first configuration file based on the type of service provided by the first service instance. In some embodiments, the pluggable module has knowledge about how the provisioning data is organized in the provisioning database. The pluggable module is configured to use that knowledge to obtain the provisioning data relevant to the type of service provided by the first service instance.

In some embodiments, the configuration files indicates at least one of the following types of data: an identification of one or more domains; domain mapping information; an identification of one or more clients; mail relay configuration data; and mail transport configuration data.

In some embodiments, at least one of the one or more configuration files comprises at least a portion of a policy related to at least one of: encrypting, quarantining, antivirus filtering, anti-spam filtering, archiving, or branding the electronic messages. As an example, a portion of a policy may comprise one or more rules of the policy.

According to certain embodiments, a service instance comprises an interface and processing circuitry. The interface is configured to obtain a configuration file from a repository managed by a provisioning manager. The configuration file is obtained using a file distribution technology. The processing circuitry is configured to configure the service instance based on the configuration file.

According to certain embodiments, a non-transitory computer readable medium stores logic that, when executed by processing circuitry of a service instance, is operable to cause the service instance to perform actions comprising obtaining a configuration file from a repository managed by a provisioning manager and configuring a service instance based on the configuration file. The configuration file is obtained using a file distribution technology.

According to certain embodiments, a method comprises obtaining a configuration file from a repository managed by a provisioning manager and configuring a service instance based on the configuration file. The configuration file is obtained using a file distribution technology.

Certain embodiments of the above-described service instance, computer readable medium, and/or method may include one or more additional features, such as any one or more of the following:

Some embodiments periodically poll the repository managed by the provisioning manager, obtain an updated configuration file from the repository, and configure the service instance based on the updated configuration file.

In some embodiments, the configuration files indicates at least one of the following types of data: an identification of one or more domains; domain mapping information; an identification of one or more clients; mail relay configuration data; and mail transport configuration data.

In some embodiments, at least one of the one or more configuration files comprises at least a portion of a policy related to at least one of: encrypting, quarantining, antivirus filtering, anti-spam filtering, archiving, or branding the electronic messages. As an example, a portion of a policy may comprise one or more rules of the policy.

Embodiments of the present disclosure may provide certain advantages. In some embodiments, a provisioning manager 40 may apply provisioning data 22 to a configuration file template or set of templates to facilitate formatting the provisioning data 22 in a manner that can be used by a service instance 50. In certain embodiments, a service instance 50 may be provisioned independently of other service instances 50. For example, a first service instance 50 need not know about the other service instances 50 and need not apply the same provisioning as the other service instances 50. Certain embodiments configure provisioning manager 40 in a cloud or data center such that provisioning manager 40 can manage configuration files for many service instances 50 (whether in a single tenant or multi-tenant environment). The provisioning can be applied to a variety of different types of service instances (e.g., provisioning can be applied to any software that is configurable with a configuration file). Certain embodiments may use a plurality of provisioning managers 40. For example, each provisioning manger 40 may manage a subset of service instances 50. The service instances 50 may be allocated among provisioning managers 40 in any suitable manner (e.g., geographical proximity, network performance (e.g., provisioning manager 40 that can be reached with high reliability or low delay), association with a particular enterprise, type of service instance—such as one provisioning manager to provision antivirus filters and another provisioning manager to provision antispam filters, or other suitable allocation).

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A system, comprising:
a processor;
a non-transitory computer readable medium, comprising instructions for:
generate a configuration file indicating how to provision a service instance utilized for electronic mail based on provisioning data from a provisioning database;
commit the configuration file to a repository, wherein by committing the file to the repository the configuration file is made available to the service instance;
determine that the configuration file applies to the service instance; and
send a notification associated with the configuration file for that service instance to the service instance by queuing the notification in a message queue associated with that service instance.

2. The system of claim 1, wherein the configuration file is associated with an encryption policy, quarantine policy, anti-virus policy, anti-spam policy, archiving policy or branding policy for electronic mail messages.

3. The system of claim 1, wherein the notification indicates that the configuration file has been committed to the repository.

4. The system of claim 1, wherein the configuration file is committed to the repository according to a naming convention allowing the service instance to determine if the configuration file is applicable to the service instance.

5. The system of claim 1, wherein the configuration file is committed to the repository according to a location in the repository that allows the service instance to determine if the configuration file is applicable to the service instance.

6. The system of claim 1, wherein the configuration file is generated in response to a notification the provisioning data has been created or updated.

7. A method, comprising:
generating a configuration file indicating how to provision a service instance utilized for electronic mail based on provisioning data from a provisioning database;
committing the configuration file to a repository, wherein by committing the file to the repository the configuration file is made available to the service instance;
determining that the configuration file applies to the service instance; and
sending a notification associated with the configuration file for that service instance to the service instance by queuing the notification in a message queue associated with that service instance.

8. The method of claim 7, wherein the configuration file is associated with an encryption policy, quarantine policy, anti-virus policy, anti-spam policy, archiving policy or branding policy for electronic mail messages.

9. The method of claim 7, wherein the notification indicates that the configuration file has been committed to the repository.

10. The method of claim 7, wherein the configuration file is committed to the repository according to a naming convention allowing the service instance to determine if the configuration file is applicable to the service instance.

11. The method of claim 7, wherein the configuration file is committed to the repository according to a location in the repository that allows the service instance to determine if the configuration file is applicable to the service instance.

12. The method of claim 7, wherein the configuration file is generated in response to a notification the provisioning data has been created or updated.

13. A non-transitory computer readable medium, comprising instructions for:
generating a configuration file indicating how to provision a service instance utilized for electronic mail based on provisioning data from a provisioning database;
committing the configuration file to a repository, wherein by committing the file to the repository the configuration file is made available to the service instance;
determining that the configuration file applies to the service instance; and
sending a notification associated with the configuration file for that service instance to the service instance by queuing the notification in a message queue associated with that service instance.

14. The non-transitory computer readable medium of claim 13, wherein the configuration file is associated with an encryption policy, quarantine policy, anti-virus policy, anti-spam policy, archiving policy or branding policy for electronic mail messages.

15. The non-transitory computer readable medium of claim 13, wherein the notification indicates that the configuration file has been committed to the repository.

16. The non-transitory computer readable medium of claim 13, wherein the configuration file is committed to the repository according to a naming convention allowing the service instance to determine if the configuration file is applicable to the service instance.

17. The non-transitory computer readable medium of claim 13, wherein the configuration file is committed to the repository according to a location in the repository that allows the service instance to determine if the configuration file is applicable to the service instance.

18. The non-transitory computer readable medium of claim 13, wherein the configuration file is generated in response to a notification the provisioning data has been created or updated.

* * * * *